Aug. 28, 1951  E. H. SHAFF  2,566,036
HOIST BRAKE MECHANISM
Filed Feb. 15, 1946  2 Sheets-Sheet 1

INVENTOR
Ernest H. Shaff
ATTORNEYS

Aug. 28, 1951  E. H. SHAFF  2,566,036
HOIST BRAKE MECHANISM
Filed Feb. 15, 1946  2 Sheets-Sheet 2
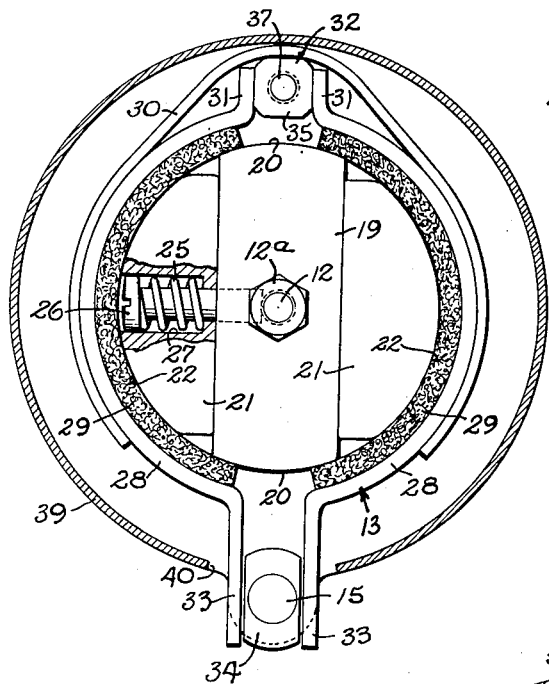
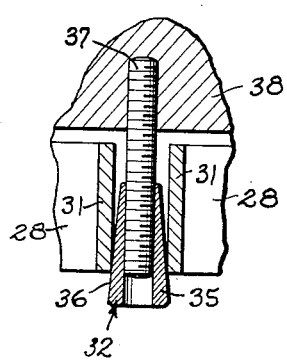
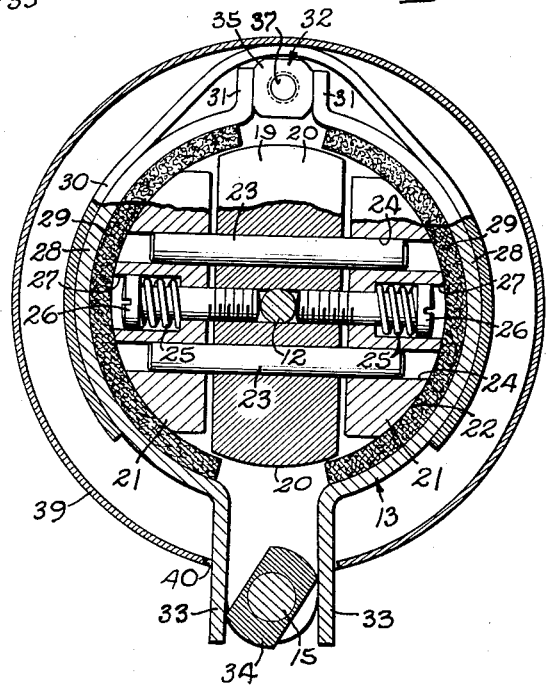
INVENTOR
Ernest H. Shaff
ATTORNEYS Patented Aug. 28, 1951

2,566,036

UNITED STATES PATENT OFFICE 2,566,036

HOIST BRAKE MECHANISM

Ernest H. Shaff, Spring Lake, Mich., assignor to Keller Tool Company, Grand Haven, Mich., a corporation of Michigan Application February 15, 1946, Serial No. 647,956

10 Claims. (Cl. 188—166)

The invention pertains to portable motor driven hoists and has especial reference to hoists powered by pneumatic motors.

The primary object of the invention is to provide an improved brake mechanism performing the dual purpose of a load brake for maintaining the load in various positions and of a motor brake for limiting the speed of rotation of the driven shaft under the influence of the load so as to avoid injury to the motor.

A further object is to provide a brake mechanism of a practical character relatively simple in construction and with the parts compactly arranged.

Another object is to provide for the easy adjustment of the brake mechanism.

The objects of the invention, thus generally set forth, together with other and ancillary advantages, are attained by the construction and arrangement shown by way of illustration in the accompanying drawings, in which:

Fig. 2 is a vertical sectional view on a somewhat enlarged scale, taken approximately in the plane of line 2—2 of Fig. 1 and illustrating the load braking function of the mechanism.

Fig. 3 is a similar view taken in the plane of line 3—3 of Fig. 1 and illustrating the motor braking function.

Fig. 4 is a fragmentary sectional view, taken approximately in the plane of line 4—4 of Fig. 1 and also on an enlarged scale.

Figure 1:
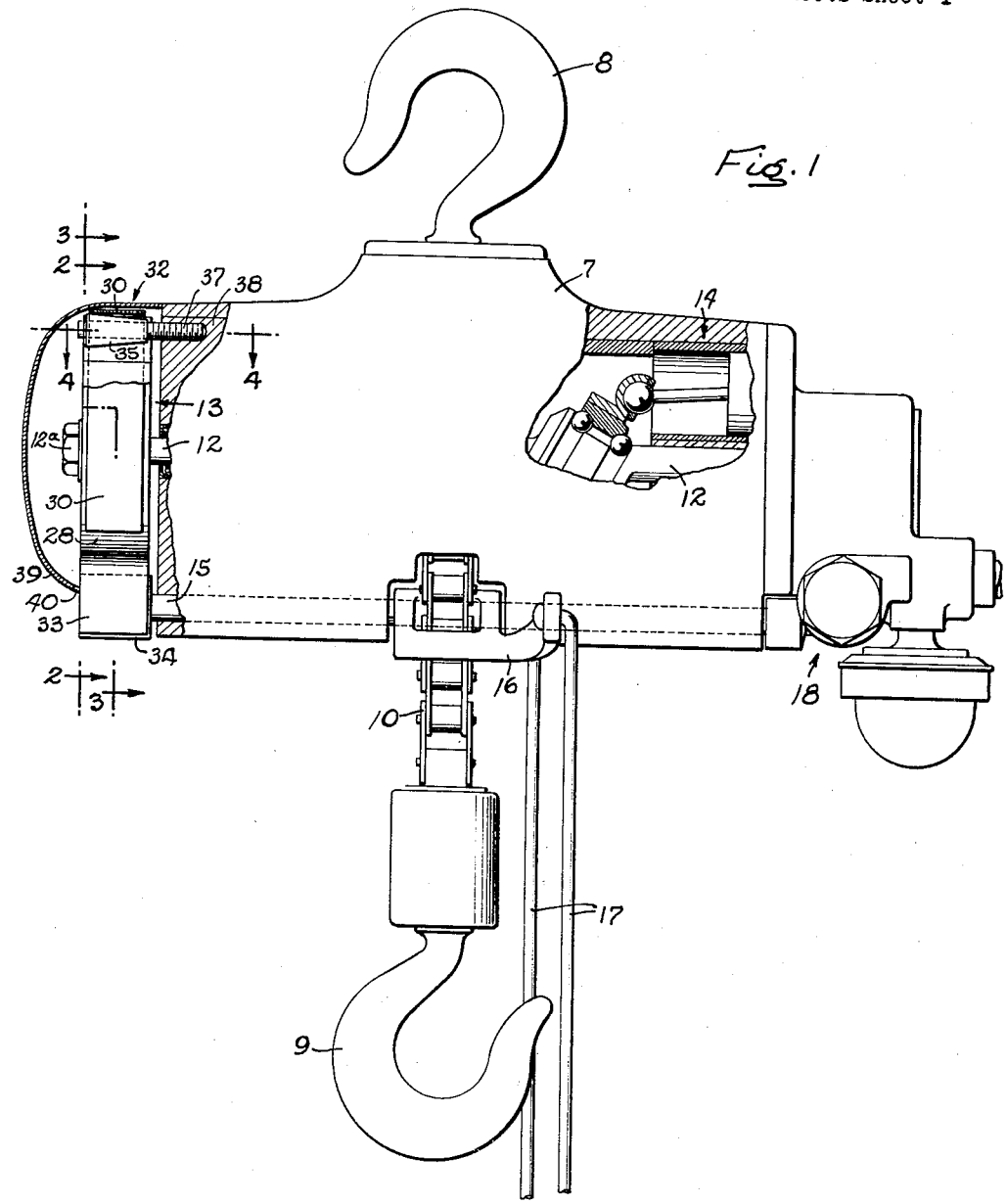
Figure 1 is a side elevational view of a hoist embodying my invention, a portion of the housing being broken away to show the brake mechanism.

In the illustrative embodiment of my invention selected for purposes of illustration, I have shown a portable hoist comprising a casing 7 equipped with a suspension hook 8 and a load support in the form of a hook 9. The latter is suspended from a chain 10 running over a sprocket (not shown) arranged for actuation by a motor driven shaft 12. 13 designates generally the improved brake mechanism operative to hold the shaft 12 stationary whereby to maintain the load suspended from the hook 9 at any desired elevation and also serving to limit the speed of rotation of the shaft 12 to avoid injury to the pneumatic motor 14 shown partially in Fig. 1. The hoist also includes a control mechanism comprising a control rod 15 suitably journaled in the lower portion of the casing and arranged for actuation by a conventional lever mechanism 16 equipped with pull cords 17. The control rod is operatively associated with the brake mechanism in a manner which will presently appear and additionally with a reversing valve 18 at the right-hand end of the casing as shown in Fig. 1.

The improved brake mechanism comprises a sectional drum operatively connected with the driven shaft 12 for rotation therewith and a manipulable braking means arranged for manual actuation through the operation of the control rod 15. The drum is made sectional so as to be effective in part in cooperation with the braking means to hold the shaft 12 against rotation under the influence of the load and in part for coaction with the braking means for limiting the speed of rotation of the shaft. In the present instance, the drum comprises a main or central section in the form of a block 19 fast upon the shaft 12 and having arcuate braking surfaces 20 at opposite ends. On opposite sides of the block 19 are disposed two auxiliary sections each in the form of a segment 21 providing an arcuate braking surface 22 and mounted for rotation with the block 19 but slidable radially with respect to the axis of the shaft 12. For this purpose, the block 19 is equipped with two dowel pins 23 disposed on opposite sides of the shaft 12 and projecting from opposite sides of the block into holes 24 formed in the segments 21. The segments normally occupy the contracted position illustrated in Fig. 2 under the influence of coiled expansion springs 25. The springs encircle diametrically opposed screws 26 threaded into the block 19 and having headed outer end portions received within a recess 27 formed in the drum segments 21. As will be seen, the springs bear between the heads of the screws and the bottoms of the recesses 27 and act to hold the segments against the outer flat faces of the block 19.

The brake drum may be held upon the shaft 12 in any suitable way. As shown, the outer end of the shaft is equipped with a nut 12ª, and the screws 26 may engage with the opposite sides of the shaft as shown in Fig. 3.

The manipulable brake means for coaction with the sectional drum comprises in the present preferred embodiment a pair of segmental brake shoes 28 each equipped with a suitable brake lining 29 and pressed radially inward toward the drum by spring means in the form of a leaf spring 30. At one end, herein the upper end, the brake shoes are formed with outturned end portions 31 for coaction with an adjusting device 32 and at their other ends they are formed with outward extensions or legs 33 for coaction with a cam block 34 on the control rod 15.

The adjusting device 32 comprises a wedge member in the form of a block 35 generally rectangular in cross section and having tapered sides 36. As shown in Fig. 4 this wedge member is arranged for movement axially relative to the lateral extension 31 of the brake shoes. In the present instance, the wedge member is mounted on a threaded rod 37 anchored in a plate 38 rigid with the casing 7. The outer end portion of the wedge member projects a sufficient distance beyond the shoes 28 so that it may be engaged by a wrench or other suitable tool for turning purposes. It will be seen that the flat sides of the wedge members as seen in Fig. 2 coact with the extensions under the influence of the leaf spring 30 to hold the wedge member in adjusted position. Thus the latter is adjustable axially through a relatively short increment by turning the wedge member a quarter turn and through this adjustment the brake shoes are rendered adjustable radially with respect to the sectional drum.

The cam block 34 is positioned on the control rod 15 in accordance with conventional practice so that irrespective of the direction of rotation imparted to the rod through the manipulation of the pull cords 17, the shoes will be cammed outwardly with respect to the drum so as to release the shoes from engagement with the fixed section 19 thereof. Accordingly, the brake is adapted for release as an incident to the actuation of the control rod in starting the motor in either direction.

To exclude dust and dirt from the mechanism the case is preferably equipped with an end cap 39. As shown in Fig. 3, the cap is provided with an aperture 40 in its lower portion for the passage of operating lugs or extensions 33.

Normally, the parts of the brake mechanism occupy the position illustrated in Fig. 2 in which the motor braking segments 21 are retracted and the shoes 28 are held by the leaf spring 30 in engagement with the arcuate braking surfaces 29 at opposite ends of the block 19. Movement of the control rod in one direction or the other forces the cam 34 against the actuating legs 33 of the brake shoes, moving the latter so as to carry the shoes out of engagement with the block, the motor being initiated in operation in one direction or the other depending upon the actuation of the reversing valve 18. In the event that the speed of the rotation of the shaft 12 under the influence of the load exceeds a predetermined rate, the motor braking segments 21 move outwardly against the action of their respective springs 25 into engagement with the braking surfaces on the shoes so as to reduce the descent of the load, thereby preventing the load from driving the shaft 12 at a speed sufficiently high to damage the motor 14.

I claim as my invention:

1. In a hoist having a load support and a motor driven shaft with which said support is operatively associated, a brake mechanism comprising a sectional drum including a fixed section rotatable with the shaft and a pair of movable sections slidable radially of the shaft toward and from the fixed section and mounted for rotation therewith, brake means arranged for coaction with said drum, spring means acting to force said brake means into engagement with the fixed section of the drum, manually operable means for disengaging the brake means from said fixed section of the drum, and spring means normally acting on said movable sections to hold them disengaged from said brake means but yieldable under the action of centrifugal force when the speed of the driven shaft exceeds a predetermined rate to permit engagement with said brake means.

2. In a hoist having a motor driven shaft, a main brake member rotatable with said shaft, an auxiliary brake member also rotatable with said shaft and movable radially thereof toward and from the main brake member, manually operable brake means movable into and out of engagement with said main brake member, and spring means acting upon said auxiliary brake member normally operative to hold it out of engagement with said brake means but yieldable to permit engagement with the brake means when the speed of the shaft exceeds a predetermined rate.

3. In a hoist having a motor driven shaft, a main brake member rotatable with the shaft, a manually operable control element, brake means yieldably urged into engagement with said brake member and movable by said control element into disengaged relation to the main brake member, and an auxiliary brake member rotatable with the shaft and movable into engagement with said braking means when the latter is in disengaged relation to the main brake member, said auxiliary braking means being yieldably held out of engagement with the braking means when the latter is in engagement with the main brake member.

4. In a hoist having a motor driven shaft, a main brake member rotatable with the shaft, braking means including a shoe spring-pressed into engagement with said main brake member, means for disengaging the brake shoe from the main brake member, and an auxiliary brake member rotatable with the main brake member and normally held yieldably out of contact with said shoe, said auxiliary brake member being movable automatically into engagement with the brake shoe when the speed of rotation of the shaft exceeds a predetermined rate.

5. A brake mechanism for a hoist having a shaft and a load support connected with said shaft, a sectional brake drum comprising a central block rotatable with the shaft and a pair of segmental blocks disposed on opposite sides of the central block and mounted for movement radially of the shaft, and brake means encircling said drum and movable into and out of engagement with the central block of the drum, said segmental blocks being movable automatically into engagement with said brake means in the disengaged position thereof when the speed of the shaft under the influence of the load exceeds a predetermined value.

6. A combined load and motor brake for hoists comprising a sectional brake drum including a central block and segmental side blocks, means carried by the central block for guiding the central blocks radially of the shaft while compelling rotation of the several sections of the drum in unison, and brake means encircling the drum and arranged for coaction with the central section thereof when functioning as a load brake and with the segmental sections thereof when acting as a motor brake.

7. A brake mechanism for a hoist having a shaft and a load support associated with said shaft comprising, in combination, a drum having a plurality of sections rotatable with the shaft, brake means encircling said drum and providing diametrically opposed braking surfaces, and means normally operative to effect engagement of said braking surfaces with one of the sections of the drum so as to hold said shaft against rotation under the influence of the load, said brake means being engageable by another section of the drum to limit the speed of rotation of the shaft under the influence of a load when the brake means occupies a disengaged relation to the first mentioned section of the drum.

8. A brake mechanism for hoists comprising a drum having a main section and a pair of auxiliary sections, a pair of brake shoes disposed on opposite sides of the drum, manually operable means disposed at one side of the drum for moving said shoes toward and from the drum, and means diametrically disposed with respect to said manually operable means for adjusting the position of the shoes toward and from the drum, said pair of shoes being engageable with said main section of said drum to hold the shaft against rotation, and also engageable with said pair of auxiliary sections movable under the action of centrifugal force to retard the descent of the load, said adjusting means being effective to simultaneously vary the position of said shoes toward and from each of said drum sections.

9. A brake mechanism for hoists comprising a drum, a pair of brake shoes disposed on opposite sides of the drum and having pairs of spaced actuator elements disposed substantially diametrically of the drum, an operating member interposed between one pair of elements at one side of the drum, a manually operable adjusting member disposed between the other pair of elements at the other side of the drum, said drum comprising a main section engageable by said shoes and a pair of auxiliary sections movable radially under the action of centrifugal force, and a leaf spring of generally U-shape having opposite side portions engaging the outer sides of said shoes and an interemediate portion shaped to accommodate said adjusting member and the actuating elements engaging therewith.

10. A brake mechanism for hoists having a casing comprising, a brake drum, a pair of arcuate brake shoes disposed externally about said drum in opposed relation, each of the adjacent end portions of said shoes providing a pair of opposed bearing surfaces, an actuator cam interposed between one pair of said bearing surfaces for moving said shoes radially outwardly out of engagement with said drum, a rectangular adjusting block having axially tapered sides interposed between the other pair of said bearing surfaces, said block being in threaded engagement with said casing for axial movement upon rotation of said block, the smaller end of said block being adjacent said casing to restrain said shoes from outward axial displacement relative to said drum, and spring means yieldably forcing said brake shoes inwardly toward said drum and in a direction to cause said bearing surfaces to bear against said cam and said block respectively.

ERNEST H. SHAFF.

REFERENCES CITED

The following references are of record in the file of this patent:

UNITED STATES PATENTS

| Number | Name | Date |
| --- | --- | --- |
| 1,113,567 | Lenhart et al. | Oct. 13, 1914 |
| 1,188,098 | Philips | June 20, 1916 |
| 1,303,734 | Smythe | May 13, 1919 |
| 1,387,199 | Gormley | June 28, 1921 |
| 1,658,293 | La Londe et al. | Feb. 7, 1928 |
| 1,658,561 | Kennington | Feb. 7, 1928 |
| 1,687,127 | Gormley | Oct. 9, 1928 |
| 1,706,553 | Stucatur | Mar. 26, 1929 |
| 1,904,089 | Schwerin | Apr. 18, 1933 |
| 1,974,583 | Parker | Sept. 25, 1934 |
| 2,134,512 | Hall | Oct. 25, 1938 |
| 2,208,846 | Harlbut | July 23, 1940 |